United States Patent [19]
Giner et al.

[11] Patent Number: 4,469,760
[45] Date of Patent: Sep. 4, 1984

[54] REDOX BATTERY INCLUDING A BROMINE POSITIVE ELECTRODE AND A CHROMIUM ION NEGATIVE ELECTRODE, AND METHOD

[75] Inventors: Jose D. Giner, Brookline; Herbert H. Stark, Waltham, both of Mass.

[73] Assignee: Electric Power Research, Institute, Palo Alto, Calif.

[21] Appl. No.: 300,576

[22] Filed: Sep. 8, 1981

[51] Int. Cl.³ .............................................. H01M 8/20
[52] U.S. Cl. ..................................... 429/21; 429/105; 429/199; 429/202; 429/15
[58] Field of Search ...................... 429/15, 21, 29, 101, 429/105, 199, 218, 202

[56] References Cited
U.S. PATENT DOCUMENTS

| 4,105,829 | 8/1978 | Venero | 429/15 |
| 4,159,366 | 6/1979 | Thaller | 429/15 |
| 4,162,351 | 7/1979 | Putt et al. | 429/15 |
| 4,206,269 | 6/1980 | Putt et al. | 429/15 |
| 4,362,791 | 12/1982 | Kaneko et al. | 429/101 |

Primary Examiner—Anthony Skapars
Attorney, Agent, or Firm—Flehr, Hohbach, Test, Albritton & Herbert

[57] ABSTRACT

A redox flow battery with a positive half-cell compartment containing bromide ion, bromine and a complexing organic liquid for bromine, and a negative electrode half-cell compartment containing chromium ion, and including electrolyte fluid communication therebetween.

6 Claims, 1 Drawing Figure

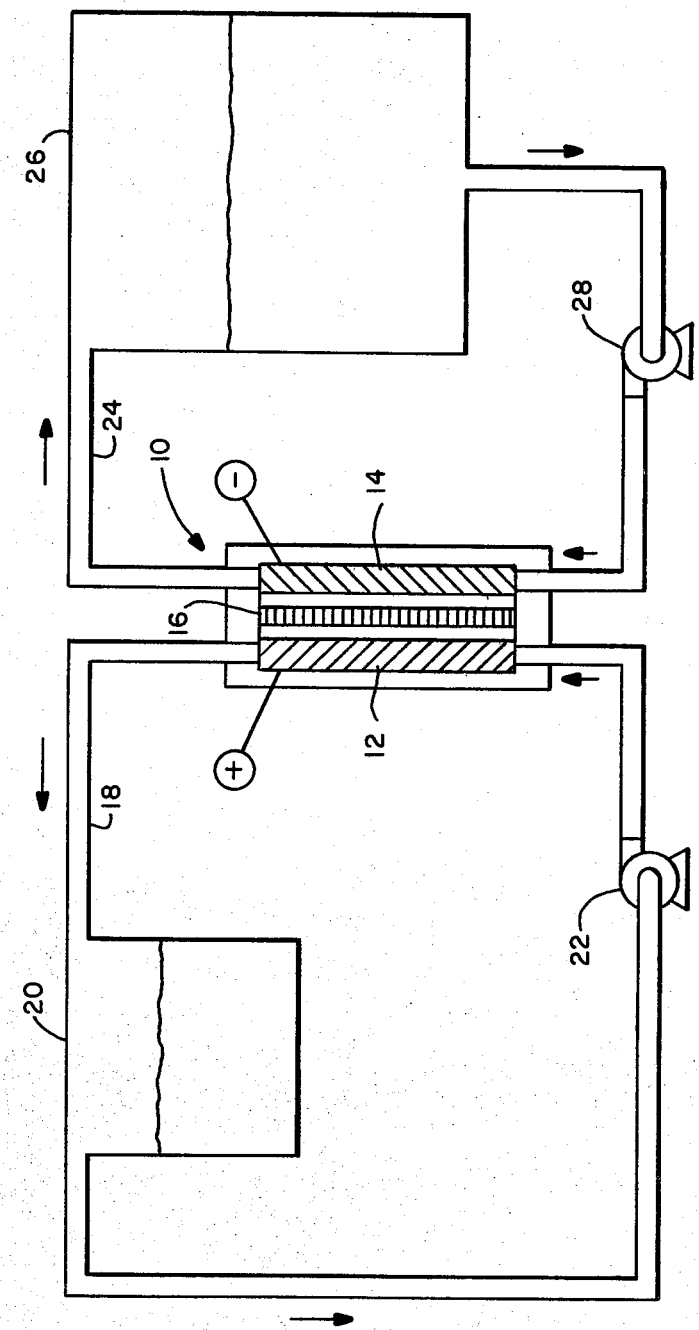

REDOX BATTERY INCLUDING A BROMINE POSITIVE ELECTRODE AND A CHROMIUM ION NEGATIVE ELECTRODE, AND METHOD

BACKGROUND OF THE INVENTION

The invention relates to a redox battery, specifically including a bromine positive electrode and a chromium negative electrode.

Conceptually, redox batteries are attractive for utility bulk energy storage because there are no morphology changes in the electrodes. However, none of the known redox couples combine all of the properties desirable for bulk energy storage.

A number of halogen-type cells have been suggested. One such cell is a zinc-bromine battery, as described in U.S. Pat. No. 4,162,351. This is a so-called hybrid form of battery because the zinc half-cell involves plating, while the bromine half-cell is a redox type (i.e., totally soluble). In the described system, the amount of bromine in the electrolyte on the bromine side is maintained at a minimum by using a complexing agent for bromine. As described therein, a preferred form of complexing agent is a tetraalkylammonium salt, referred to as a bromine oil. One disadvantage of this type of cell is that the zinc half-cell includes the inherent problems of plating.

SUMMARY OF THE INVENTION AND OBJECTS

In accordance with the present invention, a totally redox battery flow system is provided, including a bromine-bromide half-cell and a chromium redox half-cell. Bromine content is minimized in the electrolyte of the positive electrode by the use of a bromine-complexing organic liquid.

It is a general object of the invention to provide a practical battery, particularly one suitable for bulk energy applications.

It is a particular object to provide a practical, totally redox battery.

Further objects and features of the invention will be apparent from the following description, taken in conjunction with the appendant drawing.

BRIEF DESCRIPTION OF THE DRAWING

The single FIGURE is a schematic representation of an electrochemical cell in accordance with the present invention.

DETAILED DESCRIPTION OF THE INVENTION

Referring to the drawing, a schematic representation of a cell useful for the present invention is illustrated. This cell 10 includes a bromine-bromide positive electrode 12, a redox chromium negative electrode 14, and a separator 16 therebetween.

The positive side aqueous phase electrolyte is circulated in line 18 past an oil phase chamber 20 via a pump 22. The negative side electrolyte is circulated in line 24 through a reservoir 26 via pump 28. As illustrated, the transfer of $Br_2$ between the aqueous phase (electrolyte) and the oil phase occurs at oil chamber 20. The redox battery of the present invention is based upon one or both of the following reactions at the positive electrode half-cell:

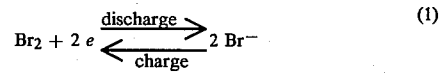 (1)

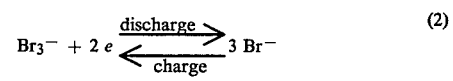 (2)

At the negative electrode half-cell, the following redox reaction occurs:

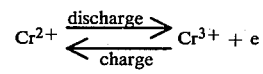

It is important to minimize the amount of bromine at the positive half-cell from being transferred to the negative half-cell, because it would result in self-discharge. To accomplish this minimization, the bromine produced in the positive electrolyte can be tied up in a complexing organic liquid, such as a tetraalkylammonium salt. Suitable characteristics of the organic liquid and suitable handling of the electrolyte loop of the positive electrode are described in detail in U.S. Pat. No. 4,162,351, incorporated herein by reference. Organic complexation of the bromine allows independent control of its aqueous phase concentration. The electrolyte loop of the positive electrode contains little aqueous electrolyte. During charge, the electrolyte flows from half-cell 12 thrugh line 18 to chamber 20, where the organic liquid-bromine complex, in essence, subtracts the bromine from the electrolyte before the electrolyte is returned to the positive electrode. In contrast, the negative electrode loop includes a relatively large reservoir 26 for the chromium salts. This reservoir is sufficiently large to store enough aqueous chromium salt electrolyte to satisfy the capacity requirements of the cell.

The reactant may be supplied in a number of convenient forms. For example, for economics, the chromium may be supplied in the chromous chloride, or sulfate, form. As the bromine discharges to bromide, the chromous ion converts to the chromic ion. The chromic ion and bromide ions thus produced can associate with each other, together with two chloride ions, or one sulfate ion. It is preferable that in the fully discharged state all of the negative and positive reactants are stored in the large negative electrolyte tank 26, in the form of an aqueous solution of $[Cr_{(aq.)}]BrCl_2$ (or $[Cr_{(aq.)}]BrSO_4$). There is a very small volume of positive electrolyte which in the fully discharged state consists of a solution of $CrBr_3$ and $CrCl_3$ (or $CrBr_3$ and $Cr_2(SO_4)_3$) and/or HCl and $H_2SO_4$.

In the fully charged state the negative electrolyte in reservoir 26 will become predominantly $CrCl_2$ (or $CrSO_4$), while the bromine produced in the positive electrolyte will be stored in the complexing organic liquid. Additional electrolyte such as NaCl, HCl, $Na_2SO_4$ or $H_2SO_4$ can be added to both the positive and negative electrolytes. Ionic conduction occurs by bromide transfer, with possible contribution of $Cl^-$ (or $SO_4^{2-}$). Chloride or sulfate are electrochemically inactive in comparison to the bromide, based upon the difference in their respective redox potentials, and so contribute to conductivity but do not change valence states to any significant extent during charging or discharging.

As set forth above, it is important to minimize the transfer of bromine from the positive half-cell to the negative half-cell. One mode of accomplishing this is the use of a suitable separator, while another is to use a low bromine concentration or small volume of positive electrolyte, storing the bromine formed in a complexing organic liquid.

Separator 16 assists to separate the bromine from the chromous ion. It may be formed of an anion permselective membrane of the type described in S. A. Alexander, et al, "Anion Permselective Membrane", Ionics, Inc., under NASA Contract DEN 3-1, March (1979). The anion membrane also prevents transfer of chromium cations to the positive half-cell. As set out above, ionic conduction can occur by chloride (or sulfate) and bromide transfer. Another type of membrane which may be employed is a microporous membrane (or separator) in which the transfer of the chromous ion from the negative half-cell to the positive half-cell may also be minimized by providing for a high degree of conversion of chromous to chromic ion throughout the negative electrode.

Referring to the positive electrode, the standard potential of the $Br_3^-/Br^-$ electrode is 1.085 volts vs. SHE (Standard Hydrogen Electrode). The potential is relatively invarient with pH, but it may be affected somewhat by the presence of chromic ion in the positive half-cell. The bromine-bromide half-cell is known to operate at high current density with relatively low polarization.

Referring to the negative electrode, the potential of the chromous/chromic electrode (0.5M $CrCl_3$, 0.5M $CrCl_2$) in 1M HCl at 25° C. is about −400 mV vs. SHE.

This chromium-bromine system is advantageous in using fully soluble reactants based on relatively inexpensive chemicals.

Referring to the positive electrode, suitable concentrations of bromine and suitable electrolytes are set forth in U.S. Pat. No. 4,162,351.

Referring to the negative electrode, suitable concentrations of chromium are from 1 to 3 molar.

In another embodiment of the flow system, not shown, instead of using a single reservoir/mixing chamber (20), an additional positive side loop from the illustrated reservoir 20 may be used to pass the oil phase to a special contacting column such as that disclosed in FIG. 17 of the publication "Assessment of Technical and Economic Feasibility of Zn/Bromine Batteries for Utility Load-Leveling", EPRI Project 635-1, Final Report, May 1979, prepared by Gould, Inc.

In a third embodiment of the flow system, not shown, the bromine is transferred between the complexing oil and electrolyte by circulating the oil directly through the positive half-cell containing electrolyte. The following examples are intended to be illustrative of the use of the present invention.

EXAMPLE 1

The system of the type set forth in FIG. 1 is formed in the fully charged state with electrolyte compositions as follows:

Negative electrolyte: 50 ml of 1 molar $CrCl_2$, 0.1 molar HCl.

Positive electrolyte: 5 ml of 1 molar $CrCl_3$, 0.1 molar HCl.

0.025 moles of $Br_2$ is initially placed in the oil phase. The $Br_2$ in oil becomes equilibrated with the aqueous phase so that a small essentially constant amount of aqueous $Br_2$ becomes available for reaction at the positive electrode. The equilibration is effected as shown in the figure using a single reservoir/mixing chamber. A cell with electrodes of geometric area 14.5 cm² (1½"×1½") when charged at 30 mA/cm² or 0.435 amps requires an electrolyte flow in the negative half-cell of 0.5 ml/min in order to obtain 50% reactant conversion in a path (two times stoichiometric flow). A higher rate of flow is desirable at the positive half-cell to minimize concentration polarization. The concentration polarization can also be lowered by using as positive electrode a porous type structure of sufficiently high real area. The data presented above can be extrapolated to a full size system taking into consideration that the experimental cell has a capacity of 0.8 Ah at 60% reactant utilization.

EXAMPLE 2

The procedure and apparatus of Example 1 are followed except that the electrolyte compositions are as follows:

Negative electrolyte: 50 ml of 1 molar $CrBr_2$, 0.1 molar HCl.

Positive electrolyte: 5 ml of 1 molar $CrBr_3$, 0.1 molar HCl.

What is claimed is:

1. A redox flow battery comprising the combination of a redox reaction type of positive electrode half-cell compartment and a redox type of negative electrode half-cell compartment, with electrolyte fluid communication therebetween, said positive electrode and negative electrode half-cell compartments being separated from each other by an anionic permselective membrane, said positive half-cell compartment containing an aqueous electrolyte including bromide ion, bromine, and a complexing organic liquid for bromine, and said negative electrode half-cell compartment containing an aqueous solution of chromium ion capable of the following redox reaction:

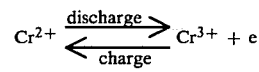

2. The battery of claim 1 together with storage means for said bromine-containing complexing organic liquid and means to transfer the bromine between the complexing organic liquid and the positive half-cell aqueous electrolyte for reaction at the electrode of said positive half-cell.

3. The battery of claim 1 in which said positive half-cell is capable of the following reaction:

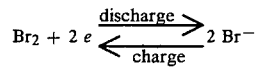

4. The battery of claim 1 in which said positive half-cell is capable of the following reaction:

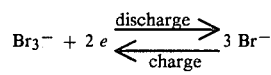

5. In a battery comprising a redox positive half-cell containing an aqueous solution containing bromide ion, bromine and a bromine complexing organic liquid and a redox negative half-cell containing chromium ion, said positive and negative half-cell being separated from each other by an anionic permselective membrane, the steps of
  (a) periodically charging and discharging the positive half-cell compartment according to the following redox reaction:

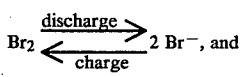

(b) periodically charging and discharging the negative half-cell compartment according to the following redox reaction:

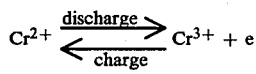

6. In a battery comprising a redox positive half-cell containing an aqueous solution with bromide ion, bromine and a bromine complexing organic liquid and a redox negative half-cell containing chromium ion, said positive and negative half-cell being separated from each other by an anionic permselective membrane, the steps of
  (a) periodically charging and discharging the positive half-cell compartment according to the following redox reaction:

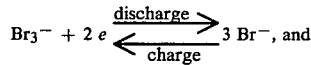

(b) periodically charging and discharging the negative half-cell compartment according to the following redox reaction:

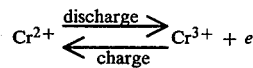

* * * * *